United States Patent
Shepelev et al.

(10) Patent No.: US 9,971,463 B2
(45) Date of Patent: May 15, 2018

(54) ROW-BASED SENSING ON MATRIX PAD SENSORS

(71) Applicant: SYNAPTICS INCORPORATED, San Jose, CA (US)

(72) Inventors: Petr Shepelev, Campbell, CA (US); Eric Scott Bohannon, Henrietta, NY (US); Kasra Khazeni, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 203 days.

(21) Appl. No.: 14/868,804

(22) Filed: Sep. 29, 2015

(65) Prior Publication Data

US 2017/0090610 A1    Mar. 30, 2017

(51) Int. Cl.

| | |
|---|---|
| *G06F 3/044* | (2006.01) |
| *G06F 3/041* | (2006.01) |
| *G06F 3/0354* | (2013.01) |
| *G06F 11/14* | (2006.01) |
| *G06F 11/00* | (2006.01) |

(52) U.S. Cl.
CPC .......... *G06F 3/044* (2013.01); *G06F 3/03547* (2013.01); *G06F 3/0416* (2013.01); *G06F 3/0418* (2013.01); *G06F 11/00* (2013.01); *G06F 11/002* (2013.01); *G06F 11/004* (2013.01); *G06F 11/006* (2013.01); *G06F 11/008* (2013.01); *G06F 11/142* (2013.01); *G06F 11/1423* (2013.01); *G06F 11/1428* (2013.01); *G06F 2201/81* (2013.01); *G06F 2203/04101* (2013.01)

(58) Field of Classification Search
CPC ........ G06F 3/0418; G06F 3/044; G06F 11/00; G06F 11/002; G06F 11/004; G06F 11/006; G06F 11/008; G06F 11/142; G06F 11/1423; G06F 11/1428; G06F 2201/81; G06F 2203/04101
See application file for complete search history.

(56) References Cited

U.S. PATENT DOCUMENTS

| | | | | |
|---|---|---|---|---|
| 4,305,135 A | * | 12/1981 | Dahl | .................. H03K 17/9622 341/33 |
| 5,831,600 A | * | 11/1998 | Inoue | ..................... G06F 3/044 178/18.01 |
| 6,476,798 B1 | * | 11/2002 | Bertram | .................. G06F 3/044 178/18.05 |

(Continued)

*Primary Examiner* — Michael J Eurice
(74) *Attorney, Agent, or Firm* — Patterson + Sheridan, LLP

(57) ABSTRACT

This disclosure generally provides an input device that includes a matrix sensor that includes a plurality of sensor electrodes arranged in rows on a common surface or plane. The input device may include a plurality of sensor modules coupled to the sensor electrodes that measure capacitive sensing signals corresponding to the electrodes. Instead of measuring sensor electrodes that are in the same column, the embodiments herein simultaneously measure capacitive sensing signals on at least two sensor electrodes that are in the same row. In one example, the sensor electrodes in the row being measured are spaced the same distance from a side of a substrate coupling the electrodes to the sensor modules and may have approximately the same electrical time constant.

21 Claims, 7 Drawing Sheets

(56) References Cited

U.S. PATENT DOCUMENTS

| | | | |
|---|---|---|---|
| 7,031,886 B1* | 4/2006 | Hargreaves | G06F 3/044 375/350 |
| 7,253,643 B1* | 8/2007 | Seguine | G06F 3/044 324/686 |
| 8,321,174 B1 | 11/2012 | Moyal et al. | |
| 8,547,118 B1* | 10/2013 | Vojjala | G06F 3/0416 324/667 |
| 8,619,055 B2 | 12/2013 | Westerinen et al. | |
| 8,743,087 B2 | 6/2014 | Hotelling et al. | |
| 8,970,524 B2 | 3/2015 | Kim et al. | |
| 8,970,537 B1 | 3/2015 | Shepelev et al. | |
| 8,994,673 B2 | 3/2015 | Hwang et al. | |
| 9,024,913 B1 | 5/2015 | Jung et al. | |
| 2001/0017548 A1* | 8/2001 | Basse | G01R 27/2605 324/678 |
| 2004/0003949 A1* | 1/2004 | Lin | G06F 3/044 178/18.01 |
| 2007/0170931 A1* | 7/2007 | Snyder | G01R 27/2605 324/658 |
| 2007/0229469 A1* | 10/2007 | Seguine | G06F 3/011 345/173 |
| 2007/0268265 A1* | 11/2007 | XiaoPing | G06F 3/044 345/173 |
| 2007/0273659 A1* | 11/2007 | XiaoPing | G06F 3/0362 345/173 |
| 2007/0296709 A1* | 12/2007 | GuangHai | G06F 3/0227 345/173 |
| 2008/0007534 A1* | 1/2008 | Peng | G06F 3/044 345/173 |
| 2008/0024455 A1* | 1/2008 | Lee | G06F 3/044 345/173 |
| 2008/0036473 A1* | 2/2008 | Jansson | G06F 3/03547 324/678 |
| 2008/0047764 A1* | 2/2008 | Lee | G08C 21/00 178/18.06 |
| 2008/0062139 A1* | 3/2008 | Hotelling | G02F 1/13338 345/173 |
| 2008/0062140 A1* | 3/2008 | Hotelling | G09G 3/3648 345/173 |
| 2008/0088595 A1* | 4/2008 | Liu | G06F 3/044 345/173 |
| 2008/0157867 A1* | 7/2008 | Krah | G06F 3/044 329/304 |
| 2008/0158172 A1* | 7/2008 | Hotelling | G06F 1/3231 345/173 |
| 2011/0210939 A1* | 9/2011 | Reynolds | G06F 3/0418 345/174 |
| 2011/0304564 A1 | 12/2011 | Kim et al. | |
| 2012/0075214 A1 | 3/2012 | Kim | |
| 2013/0113695 A1 | 5/2013 | Tseng et al. | |
| 2013/0194229 A1* | 8/2013 | Sabo | G06F 3/044 345/174 |
| 2013/0215075 A1 | 8/2013 | Lee et al. | |
| 2013/0257795 A1 | 10/2013 | Yilmaz et al. | |
| 2013/0321296 A1 | 12/2013 | Lee et al. | |
| 2014/0043281 A1 | 2/2014 | Kim et al. | |
| 2014/0132525 A1* | 5/2014 | Pyo | G06F 3/0412 345/173 |
| 2014/0132526 A1* | 5/2014 | Lee | G06F 3/0412 345/173 |
| 2014/0132534 A1 | 5/2014 | Kim | |
| 2014/0132559 A1 | 5/2014 | Kim | |
| 2014/0267145 A1 | 9/2014 | Shepelev | |
| 2014/0327644 A1* | 11/2014 | Mohindra | G06F 3/044 345/174 |
| 2015/0091864 A1* | 4/2015 | Reynolds | G06F 3/044 345/174 |
| 2015/0130753 A1 | 5/2015 | Woo et al. | |
| 2015/0138173 A1 | 5/2015 | Bae et al. | |
| 2015/0226871 A1* | 8/2015 | Ludden | G01V 3/08 324/676 |
| 2016/0259479 A1* | 9/2016 | Kang | G06F 11/00 |
| 2017/0090626 A1* | 3/2017 | Lee | G06F 3/044 |

* cited by examiner

ROW-BASED SENSING ON MATRIX PAD SENSORS

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a plurality of sensor electrodes arranged into a plurality of rows on a common surface of a substrate, where each of the rows comprises at least two of the sensor electrodes. The input device also includes a processing system that includes a plurality of sensor modules selective coupled to the plurality of sensor electrodes, where the sensor modules are configured to, during a first time period, measure first capacitive sensing signals using a first row of the plurality of rows and, during a second time period, measure second capacitive sensing signals using a second row of the plurality of rows. Moreover, a frequency of the first capacitive sensing signals is different than a frequency of the second capacitive sensing signals and each of the rows is parallel with a side of the substrate used to electrically couple the sensor electrodes to the sensor modules.

Another embodiment disclosed herein is a processing system that includes selection logic configured to selectively couple to a plurality of sensor electrodes arranged in a plurality of rows on a common surface of a substrate and a plurality of sensor modules selectively coupled to the plurality of sensor electrodes via the selection logic. The sensor modules are configured to, during a first time period, measure first capacitive sensing signals using a first row of the plurality of rows and, during a second time period, measure second capacitive sensing signals using a second row of the plurality of rows. Moreover, a frequency of the first capacitive sensing signals is different than a frequency of the second capacitive sensing signals, and each of the rows is parallel with a side of the substrate used to electrically couple the sensor electrodes to the sensor modules.

Another embodiment disclosed herein is a method that includes measuring, during a first time period, first capacitive sensing signals using a first row of a plurality of rows of sensor electrodes disposed on a common surface of a substrate and measuring, during a second time period, second capacitive sensing signals using a second row of the plurality of rows, where the first and second rows each comprises at least two sensor electrodes. Moreover, a frequency of the first capacitive sensing signals is different than a frequency of the second capacitive sensing signals, and each of the plurality of rows is parallel with a side of the substrate used to electrically couple the sensor electrodes to a plurality of sensor modules.

BRIEF DESCRIPTION OF DRAWINGS

The preferred exemplary embodiment of the present invention will hereinafter be described in conjunction with the appended drawings, where like designations denote like elements, and.

Figure 1:
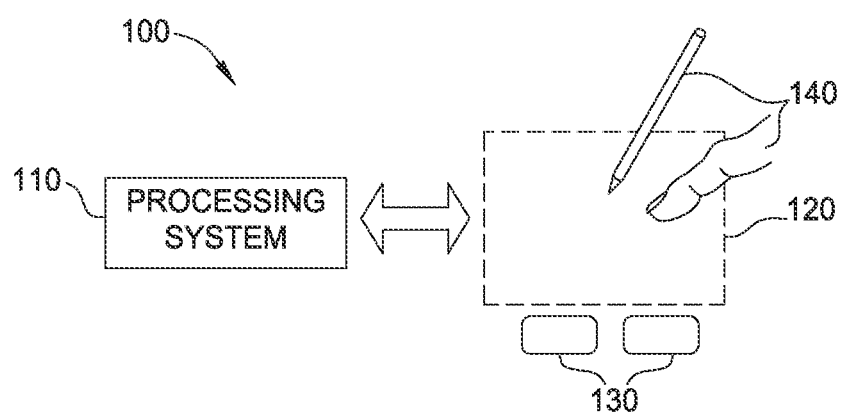
FIG. 1 is a block diagram of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input device includes a matrix sensor that includes a plurality of sensor electrodes arranged in rows on a common surface or plane. The input device may include a plurality of sensor modules coupled to the sensor electrodes that measure capacitive sensing signals corresponding to the electrodes. Instead of measuring sensor electrodes that are in the same column, the embodiments herein simultaneously measure capacitive sensing signals on at least two sensor electrodes that are in the same row. In one example, the sensor electrodes in the row being measured are spaced the same distance from a side of a substrate coupling the electrodes to the sensor modules.

In one embodiment, the sensor electrodes in a row have approximately the same electrical time constant, which means the frequency of the capacitive sensing signals used to perform capacitive sensing on the sensor electrodes in the row can be the same. However, as the input device performs capacitive sensing on rows that are further from the side of the substrate coupling the sensor electrodes to the sensor modules, the electrical time constants of the sensor electrodes increase. As a result, the input device may use capacitive sensing signals that are slower for the rows further from the sensor modules than the capacitive sensing signals used for rows closer to the sensor modules. Nonetheless, performing capacitive sensing on a row-by-row basis is advantageous to performing capacitive sensing on a column-by-column basis since with column-by-column techniques the capacitive sensing signals are limited by the sensor electrode in the column with the longest time constant (e.g., the sensor electrode furthest from the sensor modules). Thus, when sensing along the rows, the time constant for the sensor modules in the row are essentially the same which means the row closest to the sensor modules can be sensed using a higher frequency than the row furthest from the sensor modules.

In one example, the sensor modules perform absolute capacitive sensing where capacitive sensing signals are driven onto the sensor electrodes which are measured by the sensor modules. In another example, the matrix sensor may include a transmitter electrode for each row of sensor electrodes. In this embodiment, the sensor electrodes are used as receiver electrodes to perform transcapacitive sensing. As a transmitter drives a modulated signal onto the transmitter electrodes, the modulated signals generates the capacitive sensing signals (also referred to as resulting signals) on the sensor electrodes which are measured by the receivers (i.e., sensor modules).

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
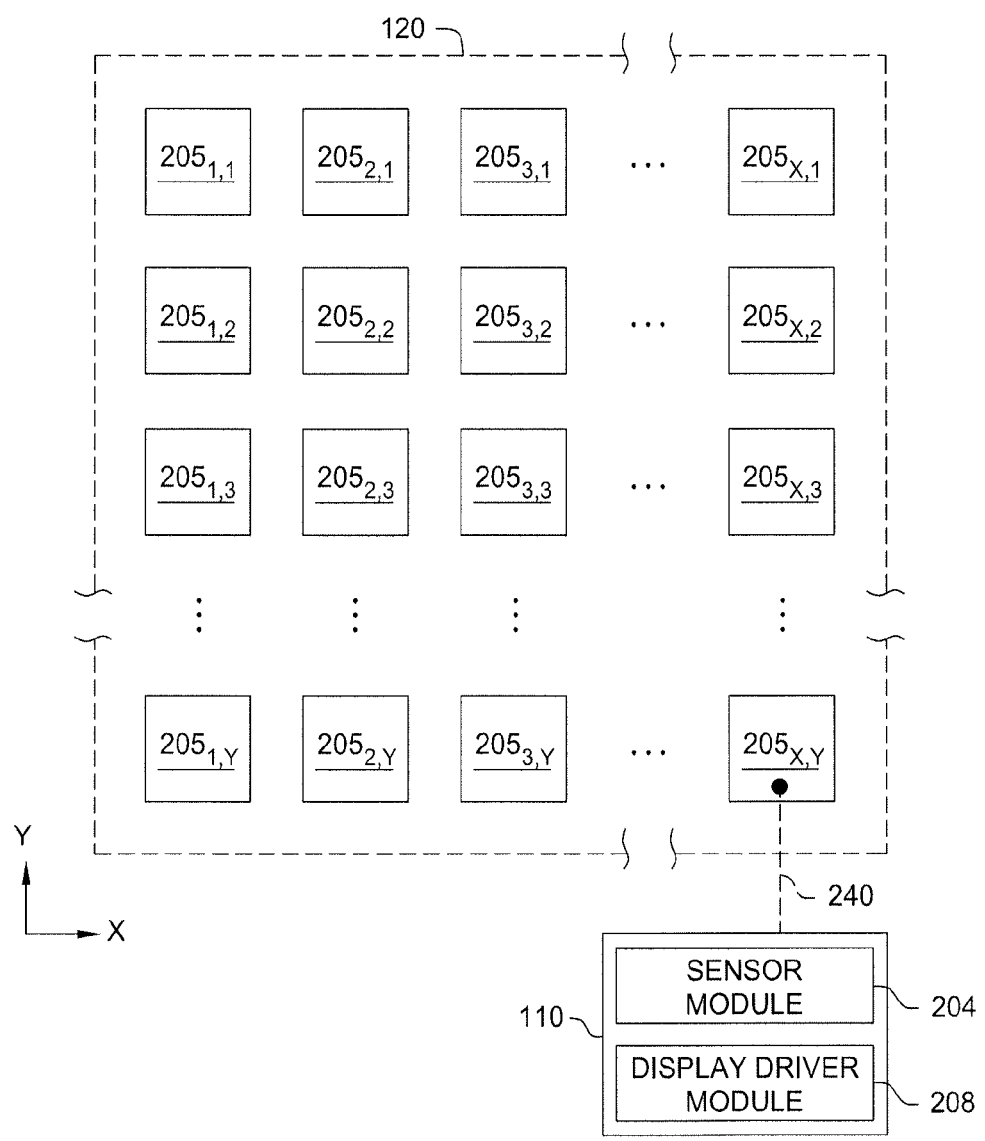
FIG. 2 is input device that includes a matrix sensor arrangement in accordance with an embodiment of the invention.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. A sensor module 204 in processing system 110 is configured to drive a sensor electrode using a trace 240 in each pixel 205 with a modulated signal (i.e., a capacitive sensing signal) and measure a capacitance between the sensor electrode and the input object (e.g., free space or earth ground) based on the modulated signal, which is utilized by the processing system 110 or other processor to determine the position of the input object.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensing electrodes includes a sensor module 204 and optionally, a display driver module 208. In one embodiment the sensor module comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
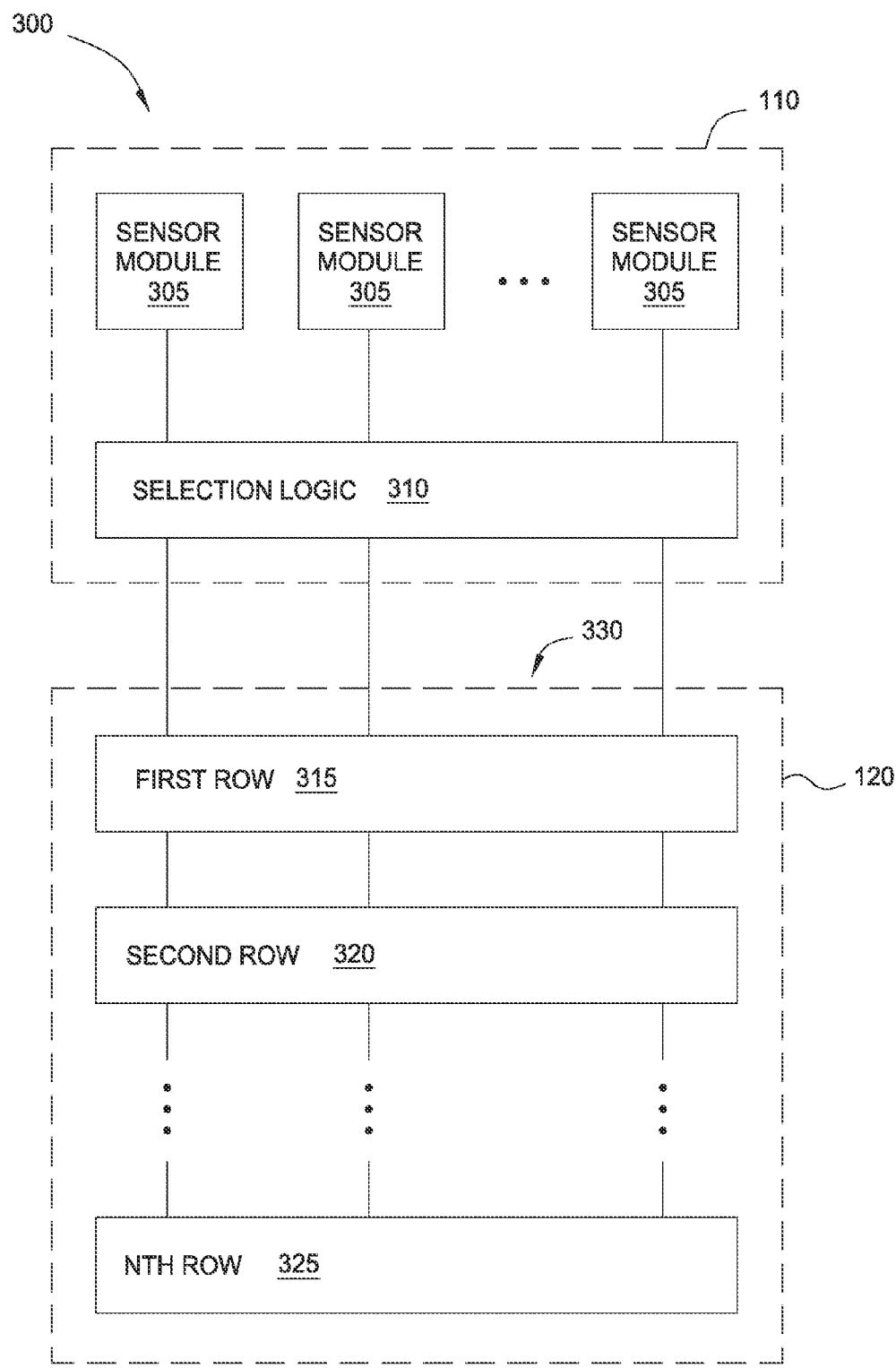
FIG. 3 is a block diagram of an input device that performs capacitive sensing by rows in a matrix sensor in accordance with an embodiment of the invention.

FIG. 3 is a block diagram of an input device 300 that performs capacitive sensing by rows in a matrix sensor in accordance with an embodiment of the invention. In FIG. 3, capacitive sensing is performed using an absolute capacitive sensing technique where modulated capacitive sensing signals are driven onto rows of sensor electrodes in the sensing region 120. By measuring changes in the capacitive sensing signals, the sensor modules 305 can detect input objects. In one embodiment, the sensor modules 305 are individual AFEs which may include integrators for measuring the change in the capacitive sensing signals due to capacitive coupling.

The sensor modules 305 are coupled to selection logic 310 which selectively connects the sensor modules 305 to one or more of the rows in the sensing region 120. In one embodiment, the sensor modules 305 may couple to a subset of the sensor electrodes in a row of the sensing region 120. The rows are arranged in parallel to a side 330 of the sensing region 120 that routes the electrical signals from the sensing region to the processing system 110. In one embodiment, the boundaries of the sensing region 120 may correspond to the boundaries of a substrate that includes the side 330 which routes electrical connections from the sensor electrodes to the processing system 110. As shown in this example embodiment, the sensor electrodes in each of the rows are spaced equidistantly from the side 330 (also referred to as an interface). As such, the lengths of the electrical connections coupling the sensor electrodes in a row to the side 330 are approximately the same. Moreover, the distance between the sensor electrodes in the first row 315 to the side 330 (and to the elements in the processing system 110) is shorter than distance between the sensor electrodes in the second row 320 to the side 330, the distance from the second row 320 to the side 330 is shorter than distance from the third row to the side 330, and so forth. The distance from the Nth row 325 (i.e., the last row) to the side 330 is the longest.

As the distance from the rows to the side 330 increase, the RC time constant of the electrical connections between the rows of sensor electrodes and the processing system 110 may also increase. Because the electrical connections between the first row 315 and the side 330 are shorter than the electrical connections between the second row 320 and the side 330, the shorter electrical connections provide less resistance, thereby decreasing the RC time constant corresponding to the first row 315 in comparison to the RC time constant of the second row 320. In one example, the resistance of the electrical connections for the first row 315 may be tens or hundreds of ohms while the resistance of the electrical connections in the Nth row 325 may be thousands or tens of thousands of ohms. Thus, assuming a constant capacitance, the RC time constant for the first row 315 may be two or three orders of magnitudes less than the RC time constant for the Nth row 325. Of course, the exact difference in the time constants of the rows will depend on the specific implementation such as the length of the electrical connections, the material and cross-sectional dimensions of the electrical connections, the spacing between the rows, the number of rows, and the like.

Because the rows have different RC time constants, the input device 300 may use different frequencies of capacitive sensing signals when performing capacitive sensing on the sensor electrodes. For example, because the first row 315 is closer to the side 330 than the second row 320, the first row 315 has a smaller RC time constant. As a result, a faster capacitive sensing signal may be used when sensing on the first row 315 than the second row 320. For example, the sensor modules 305 may drive a 700 kHz capacitive sensing signal onto the first row but drive only a 690 kHz capacitive sensing signal onto the second row 320. Because the time constant generally increases as the distance between the rows and the side 330 increases, the sensor modules 305 may drive the slowest capacitive sensing signal onto the sensor electrodes in the Nth row 325.

In one embodiment, the selection logic 320 couples the sensor modules 305 to each row during different time periods. For example, during a first time period, the selection logic 320 couples the sensor modules 305 to the sensor electrodes in the first row 315. During a second time period, the selection logic 320 couples the sensor modules 305 to the electrodes in the second row 320, and so forth. In this manner, the sensor modules 305 are coupled to the sensor electrodes in only one of the rows at any given time. Moreover, the sensor modules 305 may use progressively slower capacitive sensing signals as the selection logic 320 couples the sensor modules 305 to rows further from the side 330. For example, the sensor modules 305 may drive a 700 kHz capacitive sensing signal onto the electrodes in the first row 315, a 690 kHz capacitive sensing signal onto the second row 320, a 665 kHz capacitive sensing signal onto the third row, a 650 kHz capacitive sensing signal onto the fourth row, etc. Although the frequency of the capacitive sensing signal may decrease as the row numbers increase, that does not mean the input device 300 must sense the rows in a particular order. That is, the selection logic 310 does not need to couple the sensor modules 305 to the first row, then to the second row, then to the third row, and so forth. Instead, the sensor modules 305 may perform capacitive sensing in any order—e.g., the modules 305 may first perform capacitive sensing using the fourth row, then the first row, then the fifth row, then the second row, etc.

In another embodiment, the sensor modules 305 may perform capacitive sensing on one row during different time periods. For example, the input device 300 may include only enough sensor modules 305 to perform capacitive sensing on half the sensor electrodes in each of the rows. During a first time period, the selection logic 310 couples the sensor modules 305 to half the sensor electrodes in the row to perform capacitive sensing. During a second time period, the selection logic 310 couples the sensor modules 305 to the other half of the sensor electrodes in the row to perform capacitive sensing on the remaining sensor electrodes in the row.

In another embodiment, the sensor modules 305 may perform capacitive sensing on sensor electrodes on multiple rows simultaneously. For example, during a first time period, the selection logic 310 may couple the sensor modules 305 to the sensor electrodes in the first and second rows 315, 320 for performing capacitive sensing. During a second time period, the selection logic 310 couples the sensor modules 305 to the third and fourth rows. Moreover, the sensor modules 305 may use capacitive sensing signals with different speeds for the different groups of rows. For example, the sensor modules 305 may drive a higher speed capacitive sensing signal onto the electrodes in the first and second rows 315, 320 than the third and fourth rows. Additionally, in one or more embodiments, even though multiple rows can be coupled to the sensor modules 305 and driven simultaneously, different sensing frequencies may be used by the sensor modules 305 depending on which row a sensor module 305 is coupled to.

Figure 4:
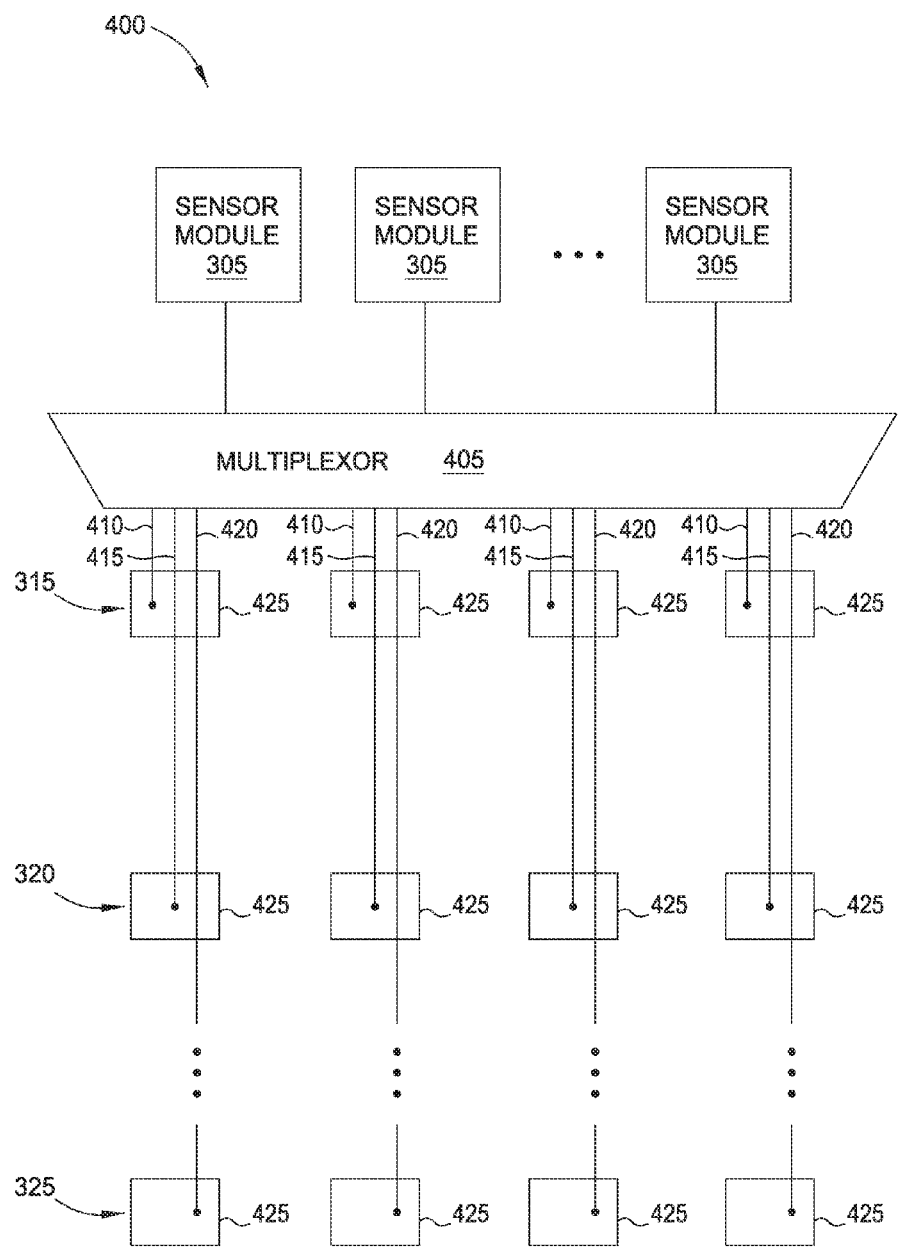
FIG. 4 is an input device for capacitive sensing along rows in a matrix sensor in accordance with an embodiment of the invention.

FIG. 4 is an input device 400 for capacitive sensing along rows in a matrix sensor in accordance with an embodiment of the invention. Like FIG. 3, input device 400 illustrates a matrix sensor that includes a plurality of rows for performing absolute capacitive sensing. Each of the rows 315, 320, and 325 in the matrix sensor include multiple individual sensor electrodes 425. As described above, these sensor electrodes 425 may have any different shapes or designs.

Each sensor electrode 425 is coupled to a multiplexor 405 (e.g., selection logic) which selectively couples the sensor electrodes 425 to the sensor modules 305. In an embodiment, if there are equal numbers of sensor electrodes 425 and sensor modules 305, the multiplexor 405 would not be needed. However, to save cost and space, it may be advantageous to include the multiplexor 405 so that the input device 400 can include fewer sensor modules 305 (e.g., AFEs) than sensor electrodes 425. To perform capacitive sensing, the multiplexor 405 selectively couples each of the sensor modules 305 to one of the sensor electrodes 425. As described above, the multiplexor 405 may iteratively couple the sensor modules 305 to each row of sensor electrodes 425. In this case, the input device 400 may include the same number of sensor modules 305 as electrodes 425 in a row. Alternatively, the input device 400 may include fewer sensor modules 305 than electrodes 425 in each row, in which case, the input device 400 may use multiple sensing bursts or time periods to perform capacitive sensing on each row. For instance, the multiplexor may couple the sensor modules 305 to the one half of the sensor electrodes 425 in a row for a first burst and then to the other half of the sensor electrodes 425 for a second burst. In another embodiment, the input device 400 may include more sensor modules 305 than sensor electrodes 425 in a row. In this scenario, the sensor modules 305 can perform capacitive sensing on sensor electrodes 425 in multiple rows simultaneously—i.e., during the same burst.

The sensor electrodes 425 are coupled to the multiplexor 405 using electrical connections 410, 415, and 420. Specifically, electrical connections 410 couple the first row 315 of sensor electrodes 425 to the multiplexor 405, electrical connections 415 couple the second row 320 of sensor electrodes 425 to the multiplexor 405, and the electrical connections 420 couple the Nth row 325 of sensor electrodes 425 to the multiplexor 405. In one embodiment, the rows of sensor electrodes 425 are on the same surface or plane of a substrate—i.e., the sensor electrodes 425 are co-planar. The electrical connections 410, 415, and 420 may be routed on the same surface as the sensor electrodes 425 or on different surfaces.

In input device 400, the electrical connections 410, 415, and 420 include vias and traces that electrically connect the sensor electrodes 425 to the multiplexor 405. The vias may extend in a direction perpendicular to the surface on which the sensor electrodes 425 are disposed (i.e., into or out of the page of FIG. 4). The vias are coupled to the sensor electrodes 425 on one end while the other end is coupled to the traces that extend towards the multiplexor 405. Thus, in this embodiment, the traces are on a different surface or plane than the sensor electrodes 425. However, in other embodiments, the vias may be omitted and the traces coupling the sensor electrodes 425 to the multiplexor 405 may be routed in the regions between the columns of the sensor electrodes 425. In this example, the electrical connections 410, 415, and 420 are co-planar with the sensor electrodes 425.

As shown, the electrical connections 410, 415, and 420 extend in the same direction, i.e., towards the multiplexor 405. In input device 400, the electrical connections 410, 415, and 420 pass through an interface on a same side of a substrate which is between the first row 315 and the multiplexor 405. The electrical connections 410 for the first row 315 may be approximately the same length and have RC time constants that are substantially the same. As used herein, the terms "approximately" and "substantially" mean the associated terms are within 50% of each other. Thus, although the distances or the RC time constant for the electrical connections and sensor electrodes in a row may be different, the embodiments herein may nonetheless be used. Put differently, the sensor modules 305 may use different frequencies when driving the capacitive sensing signals onto at least two of the rows of sensor electrodes 425 even if the RC time constants for the sensor electrodes in each of the rows are, or are not, exactly the same.

In one embodiment, the electrical connections may not terminate at the sensor electrodes as shown in FIG. 4. Instead, each of the electrical connections may extend through all the rows and through the sensing region. Although in this embodiment the electrical connections extend from the top to the bottom of the sensing region, each connection is coupled to only one of the sensor electrodes. For example, although the leftmost connection 410 may extend from the first row 315 all the way to the Nth row 325, this connection 410 is only electrically connected to the leftmost sensor electrode 425 in the first row. That is, the connection 410 does not connect to any other sensor electrodes 425. Extending the electrical connections underneath all the rows may improve display updating and mitigate display artifacts.

Figure 5:
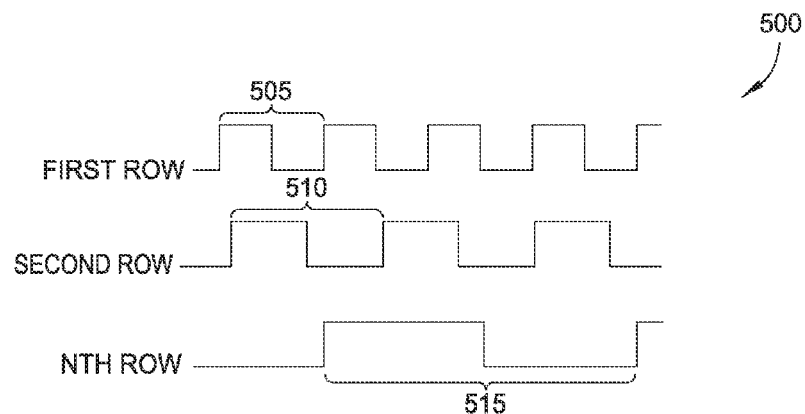
FIG. 5 is chart illustrating different sensing frequencies associated with different rows of sensor electrodes in a matrix sensor in accordance with an embodiment of the invention.

FIG. 5 is chart 500 illustrating different sensing frequencies associated with different rows of sensor electrodes in a matrix sensor in accordance with an embodiment of the invention. Specifically, chart 500 illustrates the capacitive sensing signals driven onto the sensor electrodes in the first, second, and Nth rows illustrated in FIG. 4. In this embodiment, the sensor modules use different frequencies for each of the rows although this is not a requirement. For example, the first and second rows may be driven using the same capacitive sensing signal while the Nth row is driven using a capacitive sensing signal with a different frequency.

Chart 500 illustrates a cycle 505 for the capacitive sensing signal driven on the electrodes in the first row, a cycle 510 for the capacitive sensing signal driven on the second row, and a cycle 515 for the capacitive sensing signal driven on the Nth row. The cycles 505, 510, and 515 directly correlate to the frequency of the respective capacitive sensing signal, and as such, the capacitive sensing signal for the first row is faster than the sensing signal for the second row, which is faster than the sensing signal for the Nth row.

To perform capacitive sensing, the sensor modules may drive multiple cycles during a burst. For example, each burst may include 4-20 cycles of the capacitive sensing signal. In one embodiment, the burst may be a predetermined length of time sufficient for the sensor modules to capture a capacitive sensing measurement. By using one or more bursts, the input device determines if an input object is interacting with a sensor region (e.g., a stylus or finger is hovering or contacting the input device). Although FIG. 5 illustrates a square wave as the capacitive sensing signal, other shapes may be used such as a sine wave, saw tooth, and the like.

In one embodiment, the number of cycles in a burst is the same when sensing on each of the rows. That is, the sensor module may perform seven cycles of the capacitive sensing signal for each burst, regardless if the sensor modules are coupled to the first row or the Nth row. Thus, because the sensor modules use faster capacitive sensing signals when performing capacitive sensing on the first row, the duration of the bursts is shorter than the duration of the bursts when sensing on the Nth row. As shown in chart 500, because the cycle 515 for the Nth row is three times the cycle 505 for the first row, the burst duration for the Nth row is three times longer than the burst duration of the first row. However, using different burst durations (and different frequencies of the capacitive sensing signals) may reduce the overall time required to perform capacitive sensing when compared to sensing by columns. That is, in input devices where capacitive sensing is performed by sensing multiple sensor electrodes arranged in a column rather than a row, the frequency of the capacitive sensing signal is capped by the sensor electrode with the highest RC time constant in a given column. Put differently, the signal can only go as fast as the slowest RC constant will permit. Typically, the sensor electrodes in the Nth row will have the slowest RC constant. Thus, when performing capacitive sensing using a column-by-column approach, the capacitive sensing signal is limited to the RC constant of the sensor electrodes in the Nth row 325. In contrast, when performing capacitive sensing by rows, the rows closest to the processing system can be driven with faster capacitive sensing signals. As shown in chart 500, the same number sensing cycles needed to capture a capacitive measurement can be performed in a third of the time that it takes to perform that same number of sensing cycles on the Nth row.

In another embodiment, the sensor modules may use the same burst duration when performing capacitive sensing for the rows. Here, the burst duration when sensing on the first row is the same as when sensing on the Nth row. However, because the capacitive sensing signal used when sensing on the first row is three times faster, this means three times the number of sensing cycles can be performed during the burst. Performing additional cycles may increase the accuracy of the capacitive sensing measurement. Although this embodiment may use the same amount of time to perform touch sensing as a column-by-column approach, it improves the accuracy of the measurement acquired by the sensor modules for the rows where faster capacitive sensing signals are used. Moreover, many sources of interference are at a lower frequency (i.e., less than the frequency of the capacitive sensing signal). Performing additional cycles in the bursts narrows the bandwidth of the capacitive sensing signal which may help to avoid the lower frequency noise sources.

In one embodiment, the sensor modules use capacitive sensing signals that are not harmonically related. For example, the sensor modules may drive 500 kHz capacitive sensing signals on the electrodes in the first row, 490 kHz capacitive sensing signals on the electrodes in the second row, 485 kHz capacitive sensing signals on the electrodes in the third row, and so forth. In another example of non-harmonically related signals, the sensor modules may drive 500 kHz capacitive sensing signals on the electrodes in the first and second rows simultaneously, 490 kHz capacitive sensing signals on the electrodes in the third and fourth rows simultaneously, 485 kHz capacitive sensing signals on the electrodes in the fifth and sixth rows simultaneously, and so forth.

Alternatively, the sensor modules may use capacitive sensing signals that are harmonically related. The signals may be odd harmonics or even harmonics of each other. For example, the sensor modules may drive 700 kHz capacitive sensing signals on the electrodes in the first row, 500 kHz capacitive sensing signals on the electrodes in the second row, 300 kHz capacitive sensing signals on the electrodes in the third row, and 100 kHz capacitive sensing signals on the electrodes in the fourth row. In another example, the sensor modules may drive 700 kHz capacitive sensing signals on the electrodes in the first through eighth rows simultaneously, 500 kHz capacitive sensing signals on the electrodes in the ninth through sixteenth rows simultaneously, 300 kHz capacitive sensing signals on the electrodes in the seventeenth through twenty-fourth rows simultaneously, and 100 kHz capacitive sensing signals on the electrodes in the twenty-fifth through thirty-second rows simultaneously.

One advantage of using harmonically related frequencies for the capacitive sensing signals is that a single interference burst may provide interference information for all the different frequencies, if that interference measurement is susceptible to interference at harmonic frequencies of the interference burst frequency. Continuing the previous example, performing an interference burst at 100 kHz when capacitive sensing is not being performed enables the input device to detect noise sources at the harmonics of 100 kHz. If all, or some, of the capacitive sensing frequencies used when sensing on the rows are harmonically related to 100 kHz, then the input device can use the information gathered by the interference burst to determine if there is noise the harmonic frequencies. If so, the input device can shift the frequencies of the capacitive sensing frequencies by a certain amount—e.g., 110 kHz, 330 kHz, 550 kHz, 770 kHz—to avoid the noise while still maintaining the harmonic relationship.

If the different capacitive sensing signals used for the rows are not harmonically related, the input device may perform an interference burst for each of the different frequencies. These interference bursts may be performed in the same capacitive frame, or different interference bursts may be generated for each capacitive frame. As an example of the latter, during a first capacitive frame, the input device generates an interference burst that detects noise at 100 kHz, but during second and third capacitive frames, the input device generates interference bursts that detect noise at 110 kHz and 120 kHz, respectively. Assuming only these three frequencies are used, the input device may repeat the process by generating an interference burst for detecting noise at 100 kHz during a fourth capacitive frame.

In one embodiment, the sensor modules may vary the capacitive sensing signals for a row or multiple rows during subsequent capacitive frames. That is, during a first capacitive frame, the sensor modules drive a 500 kHz capacitive sensing signals onto the first row of electrodes, but during a second frame, the modules drive a 510 kHz or a 490 kHz signal onto the first row of electrodes. Moreover, the sensor module may use the same baseline measurement for both capacitive frames. Because sensing on a row-by-row basis means that the first row (as well as other rows) may be sensed using faster capacitive sensing signals relative to a column-by-column approach, this provides flexibility for reducing or speeding up the capacitive sensing signal between the frames. By changing the frequency of the capacitive sensing signal between frames, the input device may be able to detect noise. For example, if the same baseline is used to compare the capacitive measurements captured during the two frames, then large differences between the capacitive measurements may be used as an indicator of noise. Put differently, if the measurement is much higher when driving a 500 kHz signal than driving a 490 kHz, the input device may determine there is an interfering signal at 500 kHz that is causing the discrepancy.

Although the example above discusses varying the frequency of the capacitive sensing signal used in the first row, the frequency may be altered for other rows as well. For example, the frequency on the last row may be altered to detect interfering signals assuming that the sensor modules are not driving the sensor electrodes as fast as the RC time constants and touch timing constraints will allow. Stated differently, if the RC time constant for the sensor in the last row permit at most a 100 kHz capacitive sensing signal (i.e., a faster frequency cannot be used) and the timing constraints for performing capacitive sensing do not permit using a slower frequency signal, then the capacitive sensing signal for the last row cannot be altered. However, because the rows closer to the processing system have smaller RC time constants, the capacitive sensing signals driven onto these rows may be altered (e.g., sped up or slowed down) and still be within the timing constraints for performing touch sensing.

In one embodiment, the input device may vary the capacitive sensing frequency between multiple capacitive frames for multiple rows of sensor electrodes. For example, varying the frequency of the first row may identify noise signals that generally affect the input device (e.g., noise signals that affect all of the sensor electrodes in the matrix) but does not detect local noise sources that affect only other rows. For example, varying the frequency of the first row between frames cannot detect a noise source that only affects the third row. By varying the capacitive sensing frequency for multiple rows during subsequent capacitive frames (assuming doing so does not exceed the RC time constants and timing constraints), the input device can detect both noise sources that affect all the sensor electrodes as well as local noise sources that may affect a particular row. For example, if the frequencies of the capacitive sensing signals used on all the rows are varied between frames, the input device can detect noise sources that affect all the sensor electrodes as well as local noise sources that may affect only one of the rows.

Figure 6:
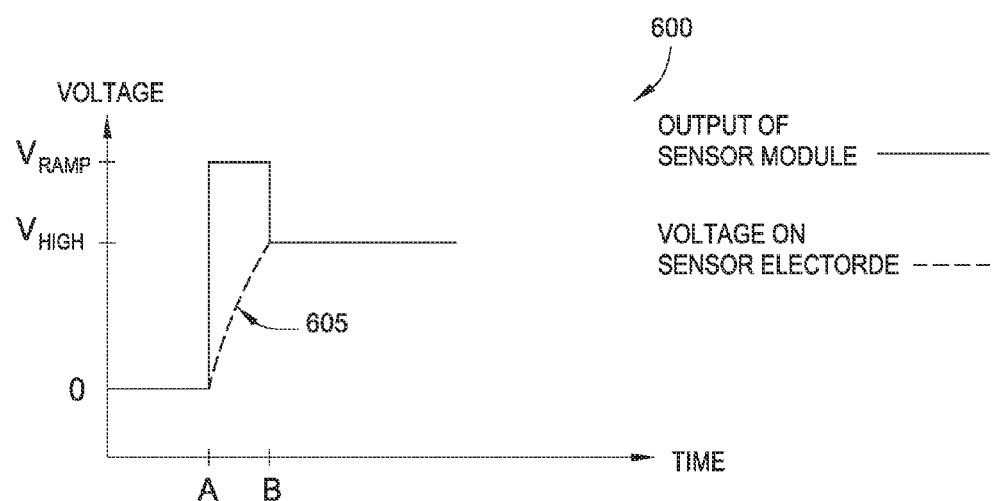
FIG. 6 is a chart illustrating pre-emphasis settings for a row of sensor electrodes in a matrix sensor in accordance with an embodiment of the invention.

FIG. 6 is a chart 600 illustrating a pre-emphasis stage for a row of sensor electrodes in a matrix sensor in accordance with an embodiment of the invention. In chart 600, the solid line represents the output of a sensor module driving a voltage onto a sensor electrode, while the dashed line represents the voltage on the sensor electrode being driven by the sensor module. Before Time A, the output of the sensor module and the voltage on the sensor electrode are both zero. However, at Time A, the sensor module outputs the voltage $V_{RAMP}$. In this embodiment, $V_{RAMP}$ represents a pre-emphasis voltage used during the pre-emphasis stage from Time A to Time B to increase the ramp rate of the voltage on the sensor electrode. In this case, $V_{RAMP}$ is greater than a desired voltage ($V_{HIGH}$) of the sensor electrode. Put differently, the sensor module outputs $V_{RAMP}$ in order to cause the voltage on the sensor electrode to reach the desired voltage $V_{HIGH}$ faster.

Because of the RC time constant, the voltage generated by the sensor module does not immediately appear on the sensor electrode. Thus, at Time A, the sensor module outputs $V_{RAMP}$ but the voltage on the sensor electrode remains at zero. Between Time A and Time B, the voltage on the sensor electrode begins to ramp 605 towards $V_{RAMP}$. Because $V_{RAMP}$ is greater than $V_{HIGH}$, the rate of the ramp 605 is greater than if the output of the sensor module was $V_{HIGH}$. Thus, the sensor electrode reaches the desired voltage $V_{HIGH}$ faster. When (or sometime before) the voltage on the sensor electrode reaches $V_{HIGH}$ at Time B, the output of the sensor module drops to $V_{HIGH}$. In this manner, the voltage on the sensor electrode does not exceed the desired voltage $V_{HIGH}$.

Because of the different RC time constants corresponding to the rows, the rate of the ramp 605 illustrated in chart 600 varies for the rows assuming the same ramp voltage is used—e.g., $V_{RAMP}$. For example, assuming chart 600 illustrates the ramp 605 of the first row, when the voltage $V_{RAMP}$ sometime is applied to the last row, the ramp 605 is slower, and thus, reaches the desired voltage $V_{RAMP}$ after Time B. Because of the different RC time constants, each of the rows may have different hold times (i.e., the length of time when the output of the sensor module is at the pre-emphasis voltage $V_{RAMP}$). The hold time for the first row may be the shortest while the hold time for the last row is the longest.

In another embodiment, the rows may have the same hold time but the input device may assign different pre-emphasis voltages for different rows. For example, although the hold times for the first row and last row are the same, the sensor module may output a larger voltage when driving the last row to compensate for its larger RC time constant than the voltage used when driving the first row. As a result, the ramp rates for the first and last rows would be the same. In other embodiments, the input device may use a combination of changing the hold time and the pre-emphasis voltages for different rows. In this manner, the input device can set pre-emphasis settings (i.e., hold times and/or pre-emphasis voltage levels) for different rows or groups of rows.

Moreover, although not shown, the input device may also use a pre-emphasis stage when performing a negative ramp, i.e., when driving the voltage on the sensor electrode from $V_{HIGH}$ to a desired low voltage. Assuming zero voltage is the desired low voltage of the capacitive sensing cycle, the sensor module may output a negative voltage which causes the voltage on the sensor electrode to ramp down from $V_{HIGH}$. Using a timing setting, the output of the sensor module may switch from the negative voltage to zero volts once (or sometime before) the voltage on the sensor electrode reaches zero volts. In this manner, positive and negative pre-emphasis voltages may be used to increase the ramp rate of the voltage on the sensor electrode. Moreover, the pre-emphasis settings are customizable on a row-by-row basis.

Figure 7:
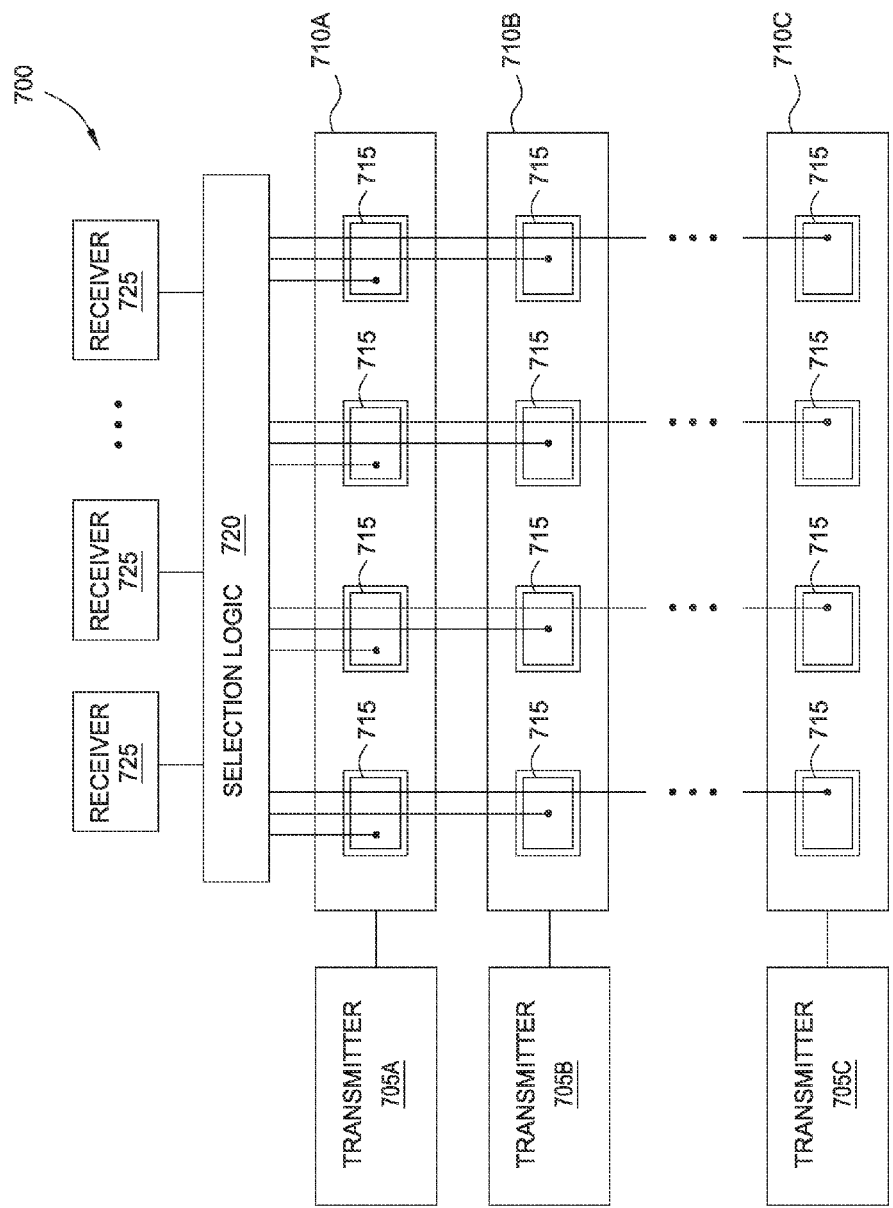
FIG. 7 is an input device for performing transcapacitive sensing along rows in a matrix sensor in accordance with an embodiment of the invention.

FIG. 7 is an input device 700 for performing transcapacitive sensing along rows in a matrix sensor in accordance with an embodiment of the invention. Unlike FIGS. 3 and 4 which illustrate performing absolute capacitance sensing, the input device 700 performs transcapacitive sensing. The input device 700 includes transmitters 705 which are coupled to respective transmitter electrodes 710. In FIG. 7, the transmitter electrodes 710 are co-planar with receiving electrodes 715 and each transmitter electrode 710 surrounds all the receiver electrodes 715 in a particular row. However, the transmitter electrodes 710 are electrically isolated from the receiver electrodes 715 in the row as well as from other transmitter electrodes 710.

When performing transcapacitive sensing, one of the transmitters 705 drives a modulated signal onto a transmitter electrode 710 which causes resulting signals in the receiver electrodes 715 in the same row. The input device 700 includes selection logic 720 which selectively couples receivers 725 (e.g., sensor modules or AFEs) to receiver electrodes 715 in one of the rows so that the receivers 725 can measure the resulting signals. For example, during a first time period, transmitter 705A drives the modulated signal on transmitter electrode 710A which generates resulting signals on the receiver electrodes 715 in the first row that are measured by the receivers 725. During a second time period, the selection logic couples the receivers 725 to the receiver electrodes 715 in the second row and the transmitter 705B drives the modulated signal on transmitter electrodes 710B which generates resulting signals that are measured by the receivers 725. This process can iterate through the rows in any order until all the rows have been sensed. Moreover, because the RC time constant for each of the rows of the receiver electrodes 715 is different, the modulated signal driven by the transmitters 705 may vary. For example, the modulated signal driven by transmitter 705A may be faster than the modulated signal outputted by the transmitter 705C. Furthermore, the embodiments described above where the capacitive sensing signals are harmonically related, or the sensing signals are varied between capacitive frames for a particular row to detect interfering signals may also apply when performing transcapacitive sensing as shown in FIG. 7.

Moreover, although FIG. 7 illustrates a transmitter 705 for each row, in another embodiment, the input device may have only one transmitter 705 coupled to selection logic which selectively couples the transmitter 705 to the particular transmitter electrode 710 being driven.

In another embodiment, the transmitters 705 may drive the modulated signal on multiple rows simultaneously. Here, it is assumed the input device 700 includes a sufficient number of receivers 725 so that the selection logic 720 can couple the receivers 725 to receiver electrodes 715 in multiple rows. For example, the input device 700 could use both transmitters 705A and 705B to simultaneously drive a modulated signal onto transmitter electrodes 710A and 710B so that the receiver electrodes 715 in the first and second rows can be sensed in parallel. Moreover, the transmitters 705A and 705B may drive a modulated signal that is faster than the modulated signal driven by transmitter 705C when the last row is sensed. In another example, instead of each transmitter electrode 710 surrounding the receiver electrodes 715 in only one row, a single transmitter electrode 710 may surround receiver electrodes 715 in multiple rows which enable one transmitter 705 to drive the modulated signal onto multiple rows of the sensing region.

In one embodiment, the input device 700 may also performs absolute capacitance sensing. For example, during a first capacitive frame, the input device 700 performs transcapacitive sensing as described above, but during a second capacitive frame, the device 700 performs absolute capacitance sensing. When doing so, the transmitters 705 and transmitter electrodes 710 may be deactivated and not used. The receivers 725 may be used to drive a capacitive sensing signal onto the receiver electrodes 715 as described in FIGS. 3 and 4. One advantage of performing both absolute and transcapacitive sensing using the same input device 700 is that one capacitive sensing technique may be better than the other technique at sensing certain types of input device (e.g., a finger or stylus) or hover versus touch detection.

Figure 8:
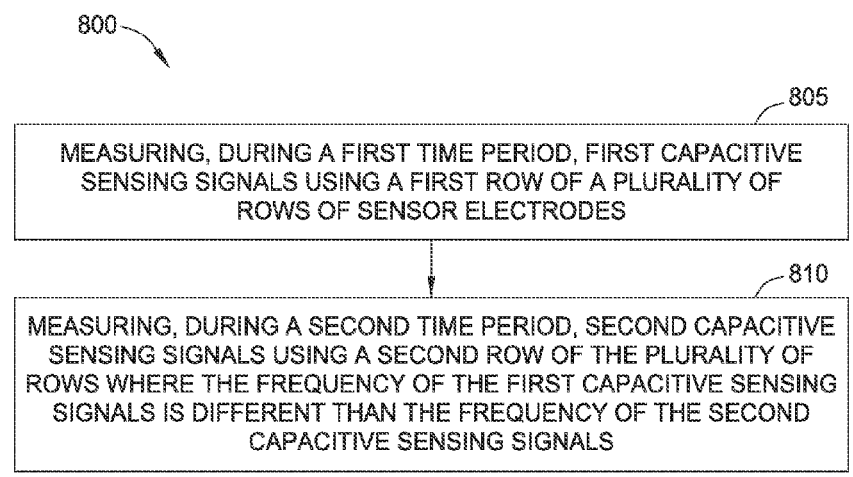
FIG. 8 is a flow chart for performing capacitive sensing on the rows in a matrix sensor in accordance with an embodiment of the invention.

FIG. 8 is a flow chart of a method 800 for performing capacitive sensing on the rows in a matrix sensor in accordance with an embodiment of the invention. The method 800 begins at block 805 where an input device measures, during a first time period, first capacitive sensing signals using a first row of a plurality of rows of sensor electrodes in a matrix sensor. As above, the rows of sensor electrodes may be co-planar and spaced different distances from an interface coupling the sensor electrodes to a processing system which includes sensor modules. Because of the varying distances between the rows and the interface, electrical connections coupling the sensor electrodes to the interface may have a different electrical time constants depending on which row the electrodes are located. For example, the rows closer to the interface may have shorter connections, and thus, smaller time constants than rows further from the interface.

At block 810, the input device measures, during a second time period, second capacitive sensing signals using a second row of the plurality of rows where the frequency of the first capacitive sensing signals is different than the frequency of the second capacitive sensing signals. For example, the first row may be closer to the interface than the second row and have a smaller RC time constant. As such, the first capacitive sensing signals may have a higher frequency than the second capacitive sensing signals.

In one embodiment, the input device includes selection logic which disconnects sensor modules from the first row of sensor electrodes and connects the sensor modules to the second row of sensor electrodes during the second time period. Similarly, at block 805, the selection logic connects the sensor modules to the first row of sensor electrodes while the second row of sensor electrodes are not connected to the sensor modules.

Method 800 may be used for absolute capacitive sensing or transcapacitive sensing. In absolute capacitive sensing, the first and second capacitive sensing signals are driven onto the sensor electrodes using the same sensor modules that capture capacitive sensing measurements. In transcapacitive sensing, the input device drives modulated signals onto separate transmitter electrodes which generate the first and second capacitive sensing signals (i.e., resulting signals) on the sensor electrodes which are measured by the sensor modules.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
   a plurality of sensor electrodes arranged into a plurality of rows on a common surface of a substrate, wherein each of the rows comprises at least two of the sensor electrodes that are electrically insulated from each other; and
   a processing system, comprising:
      a plurality of sensor modules selectively coupled to the plurality of sensor electrodes, wherein the sensor modules are configured to, during a first time period, measure first capacitive sensing signals using a first row of the plurality of rows and, during a second time period, measure second capacitive sensing signals using a second row of the plurality of rows,
      wherein a frequency of the first capacitive sensing signals is different than a frequency of the second capacitive sensing signals, and wherein each of the rows is parallel with a side of the substrate used to electrically couple the sensor electrodes to the sensor modules.

2. The input device of claim 1, wherein the sensor modules are configured to, during the first time period, measure the first capacitive sensing signals using at least two rows of the plurality of rows and, during the second time period, measure the second capacitive sensing signals using at least two rows of the plurality of rows different than the at least two rows measured during the first time period.

3. The input device of claim 1, wherein the first row is spaced closer in the common surface to the side of the substrate than the second row, wherein the frequency of the first capacitive sensing signals is faster than the frequency of the second capacitive sensing signals.

4. The input device of claim 1, wherein an average time constant of electrical connections between the first row and the sensor modules is less than an average time constant of electrical connections between the second row and the sensor modules, wherein the frequency of the first capacitive sensing signals is faster than the frequency of the second capacitive sensing signals.

5. The input device of claim 1, wherein the sensor modules are configured to, during a third time period, measure third capacitive sensing signals using a third row of the plurality of rows, wherein a frequency of the third capacitive sensing signals is different than the frequencies of the first and second capacitive sensing signals.

6. The input device of claim 1, wherein the frequency of the first capacitive sensing signals is a harmonic of the frequency of the second capacitive sensing signals.

7. The input device of claim 1, wherein the processing system further comprises:
  selection logic configured to couple the sensor modules to the first row during the first time period; and,
  during the second time period, disconnect the first row from the sensor modules and couple the second row to the sensor modules.

8. The input device of claim 1, wherein a burst duration for measuring the first capacitive sensing signals is the same as a burst duration for measuring the second capacitive sensing signals.

9. The input device of claim 1, further comprising:
  a first transmitter electrode corresponding to the first row; and
  a second transmitter electrode corresponding to the second row,
  wherein the processing system is configured to drive a first transmitting signal onto the first transmitter electrode during the first time period which results in the first capacitive sensing signals on the first row and drive a second transmitting signal onto the second row during the second time period which results in the second capacitive sensing signals on the second row.

10. The input device of claim 1, wherein the sensor modules are configured to drive the first and second capacitive sensing signals onto the first and second rows during the first and second time periods to perform absolute capacitive sensing.

11. The input device of claim 10, wherein the first and second capacitive sensing signals include respective pre-emphasis stages defined by settings that are different for the first and second rows.

12. The input device of claim 10, wherein the sensor modules are configured to, during subsequent capacitive sensing frames, alter the frequency of the first capacitive sensing signals driven on the first row to perform noise detection, wherein the frequency of the second capacitive sensing signals driven on the second row remains constant during consecutive capacitive sensing frames.

13. A processing system, comprising:
  selection logic configured to selectively couple to a plurality of sensor electrodes arranged in a plurality of rows on a common surface of a substrate; and
  a plurality of sensor modules selectively coupled to the plurality of sensor electrodes via the selection logic, wherein the sensor modules are configured to:
    during a first time period, measure first capacitive sensing signals using a first row of the plurality of rows; and
    during a second time period, measure second capacitive sensing signals using a second row of the plurality of rows, wherein a frequency of the first capacitive sensing signals is different than a frequency of the second capacitive sensing signals, wherein the frequencies of the first and second capacitive sensing signals are based on RC time constants of electrical connections coupling the plurality of sensor electrodes in the plurality of rows to the plurality of sensor modules, and wherein each of the rows is parallel with a side of the substrate used to electrically couple the sensor electrodes to the sensor modules.

14. The processing system of claim 13, wherein the selection logic is configured to, during the first time period, disconnect the sensor modules from the second row and, during the second time period, disconnect the sensor modules from the first row.

15. The processing system of claim 13, wherein the first row is spaced closer on the common surface to the side of the substrate than the second row, wherein the frequency of the first capacitive sensing signals is faster than the frequency of the second capacitive sensing signals.

16. The processing system of claim 13, wherein the sensor modules are configured to, during a third time period, measure third capacitive sensing signals using a third row of the plurality of rows, wherein a frequency of the third capacitive sensing signals is different than the frequencies of the first and second capacitive sensing signals.

17. A method comprising:
  measuring, during a first time period, first capacitive sensing signals using a first row of a plurality of rows of sensor electrodes disposed on a common surface of a substrate; and
  measuring, during a second time period, second capacitive sensing signals using a second row of the plurality of rows, wherein the first and second rows each comprises at least two sensor electrodes that are electrically insulated from each other,
  wherein a frequency of the first capacitive sensing signals is different than a frequency of the second capacitive sensing signals, and wherein each of the plurality of rows is parallel with a side of the substrate used to electrically couple the sensor electrodes to a plurality of sensor modules.

18. The method of claim 17, further comprising:
  measuring, during the first time period, the first capacitive sensing signals using multiple rows of the plurality of rows; and
  measuring, during the second time period, the second capacitive sensing signals using multiple rows of the plurality of rows, wherein the multiple rows measured during the first time period are each different than the multiple rows measured during the second time period.

19. The method of claim 17, wherein measuring the first capacitive sensing signals during the first time period further comprises:

coupling the first row to the sensor modules via selection logic, wherein the second row is disconnected from the sensor modules; and wherein measuring the second capacitive sensing signals during the second time period comprises:

coupling the second row to the sensor modules via the selection logic, wherein the first row is disconnected from the sensor modules.

20. The method of claim 19, wherein the first row is spaced closer in the common surface to the side of the substrate than the second row, wherein the frequency of the first capacitive sensing signals is faster than the frequency of the second capacitive sensing signals.

21. The method of claim 19, wherein an average time constant of electrical connections between the first row and the sensor modules is less than an average time constant of electrical connections between the second row and the sensor modules, wherein the frequency of the first capacitive sensing signals is faster than the frequency of the second capacitive sensing signals.

* * * * *